(12) United States Patent
Salzmann et al.

(10) Patent No.: US 7,219,545 B2
(45) Date of Patent: May 22, 2007

(54) SENSOR FOR LEVELS OF CONDUCTIVE LIQUIDS

(75) Inventors: Philip E. Salzmann, Cardiff, CA (US); Alec T. Harootunian, San Diego, CA (US); Michael P. Emery, Santee, CA (US); Javier H. Flores, San Diego, CA (US); Todd N. Bennett, Philadelphia, PA (US); Minh Vuong, San Diego, CA (US)

(73) Assignee: Vertex Pharmaceuticals, Inc., Cambridge, MA (US)

( * ) Notice: Subject to any disclaimer, the term of this patent is extended or adjusted under 35 U.S.C. 154(b) by 82 days.

(21) Appl. No.: 10/900,996

(22) Filed: Jul. 28, 2004

(65) Prior Publication Data

US 2006/0021432 A1    Feb. 2, 2006

(51) Int. Cl.
*G01F 23/00* (2006.01)
*G01F 23/24* (2006.01)
*G01F 23/26* (2006.01)

(52) U.S. Cl. .................. 73/304 R; 73/304 C; 73/290 R
(58) Field of Classification Search .............. 73/304 R, 73/290 R, 304 C
See application file for complete search history.

(56) References Cited

U.S. PATENT DOCUMENTS

| 3,848,627 | A | | 11/1974 | Page |
| 4,169,377 | A | * | 10/1979 | Scheib ...................... 73/304 R |
| 4,253,064 | A | * | 2/1981 | McBride, Jr. ............... 324/436 |
| 5,132,626 | A | * | 7/1992 | Limuti et al. ............... 324/432 |
| 5,262,731 | A | * | 11/1993 | Mizoguchi .................. 324/663 |
| 5,553,494 | A | * | 9/1996 | Richards ................... 73/304 R |
| 5,565,851 | A | * | 10/1996 | Richards et al. ............ 340/612 |
| 5,613,399 | A | * | 3/1997 | Hannan et al. ........... 73/304 C |
| 6,101,873 | A | * | 8/2000 | Kawakatsu et al. ....... 73/304 C |
| 6,634,229 | B1 | * | 10/2003 | Kazkaz et al. ............ 73/304 R |
| 6,962,079 | B2 | * | 11/2005 | Eguchi et al. ............ 73/304 R |
| 2005/0022595 | A1 | * | 2/2005 | Eguchi et al. ............ 73/304 R |
| 2005/0252290 | A1 | * | 11/2005 | Eguchi et al. ............ 73/304 R |

* cited by examiner

*Primary Examiner*—Hezron Williams
*Assistant Examiner*—Samir M. Shah
(74) *Attorney, Agent, or Firm*—Knobbe, Martens, Olson & Bear LLP

(57) ABSTRACT

A liquid level sensor comprises a plurality of electrodes arranged in a defined relationship with respect to a container filling trajectory, a signal generator coupled to one or more of the plurality of electrodes, a signal receiver coupled to one or more of the plurality of electrodes, and a sensing circuit coupled to at least one of the signal generator and signal receiver. The sensing circuit is configured to produce an output indicative of electrical resistance between at least one pair of the plurality of electrodes. The sensing circuit may be associated with the signal receiver and/or with the signal generator.

9 Claims, 5 Drawing Sheets

SENSOR FOR LEVELS OF CONDUCTIVE LIQUIDS

BACKGROUND OF THE INVENTION

1. Field of the Invention

The invention relates to liquid level sensors, and has especially advantageous application in a laboratory environment where small changes in liquid levels are to be measured.

2. Description of the Related Art

A wide variety of liquid level sensing methods have been proposed and employed. Mechanical methods have been employed wherein a buoyant element rides on the surface of the liquid and its position is detected. While simple to design and implement, these are difficult to miniaturize. The container has to be large enough to allow the floater to move up and down freely.

Acoustic methods have also been used in which an ultrasonic transmitter/receiver is used to launch a sound wave at the surface and detect its return. The beam spot of the sound wave is usually too large for the device to work reliably inside a small tube.

Pressure based sensing using a pressure transducer at the bottom of the container has been implemented wherein the liquid height is determined by measuring the pressure at the bottom of the container. These sensors do not work well for small volumes when surface tension becomes comparable to gravity.

Electrical schemes have also been devised. For example, the capacitance of a container may be measured to indicate fluid level. These types of detectors have been usually implemented as all-or-nothing type detectors, wherein the liquid rises to some pre-determined level, and the change is large enough to trip the detector. Another electrical scheme is described in U.S. Pat. No. 3,848,627 to Page. This device is intended to measure the water level in swimming pools, and includes a series of electrodes at different heights in a liquid filled tube. The lowermost electrode is grounded. A circuit is coupled to the remaining electrodes that energizes selected relay coils as the other electrodes change state between being grounded or electrically floating as the water level rises and falls.

None of these devices can detect small volumes at high resolution. Thus, an improved, reliable, and small size level sensor is needed.

SUMMARY OF THE INVENTION

In one embodiment, the invention includes a liquid level sensor comprising a plurality of electrodes arranged in a defined relationship with respect to a container filling trajectory, a signal generator coupled to one or more of the plurality of electrodes, a signal receiver coupled to one or more of the plurality of electrodes, and a sensing circuit coupled to at least one of the signal generator and signal receiver. The sensing circuit is configured to produce an output indicative of electrical resistance between at least one pair of the plurality of electrodes. The sensing circuit may be associated with the signal receiver and/or with the signal generator.

In another embodiment, a method of sensing liquid level comprises energizing a first electrode with an applied electrical signal for a period of less than one second and sensing the applied electrical signal with a second electrode when some or all of the first electrode is in contact with the liquid. In some advantageous embodiments the first electrode is energized for less than one millisecond. In another method of liquid level sensing, a current is passed from a first electrode in at least partial contact with the liquid to a second electrode in at least partial contact with the liquid, and a signal is outputted that depends on an amount of resistance to the current between the electrodes.

In another embodiment, a system for measuring the level of liquid in a container comprises a plurality of transmitter electrodes arranged sequentially from a lower portion of the container to an upper portion of the container. At least one receiver electrode is positioned beneath the plurality of transmitter electrodes and a control circuit comprising an output for each of the plurality of transmitter electrodes is provided. The control circuit is configured to apply a voltage individually to each of the plurality of transmitter electrodes and a threshold detector is coupled to the receiver electrode. The threshold detector is configured to detect current flow between the transmitter electrodes and the receiver electrode when liquid is in contact with at least a portion of a transmitter electrode that is energized with a voltage.

DETAILED DESCRIPTION OF THE PREFERRED EMBODIMENT

Figure 1:
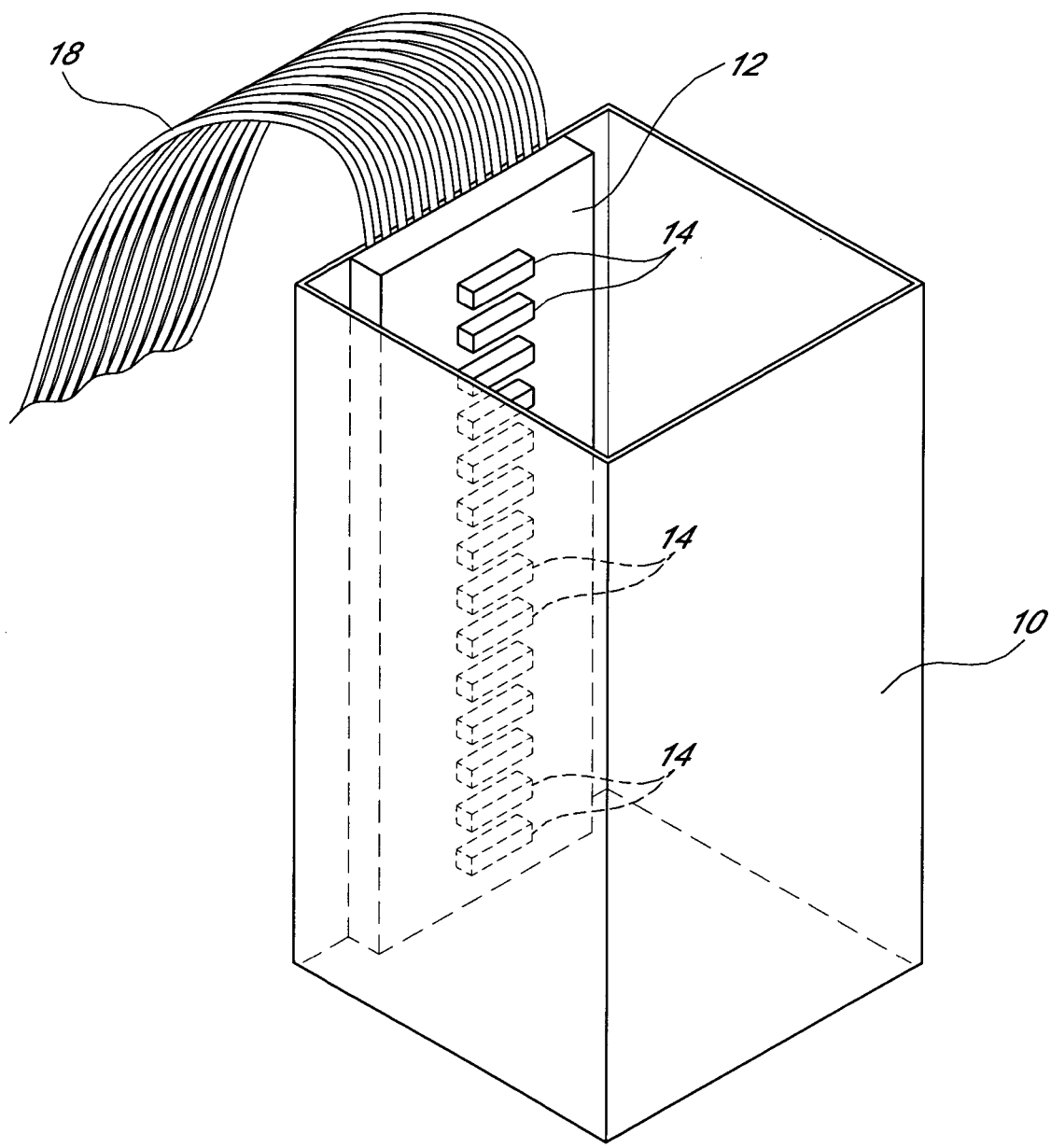
FIG. 1 is a perspective view of a liquid container with a level sensor incorporated therein.

One embodiment of the invention is shown in FIG. 1. A container 10 is configured to hold a volume of liquid to be measured. A printed circuit board 12 bearing a ladder of electrodes 14 is incorporated into the container 10. The electrodes may be quite small features that may be, for example, 0.050 inch apart or less if desired as described below.

The array of electrodes 14 is advantageously arranged in the container 10 such that a series of electrodes of the array follows a container filling trajectory as liquid is added to the container 10. Normally, and as shown in FIG. 1, this will simply involve a vertically arranged series of electrodes, but other, more complex container shapes and filling trajectories are possible. In general, there should be some relationship between which of the electrodes are submerged either fully or partially and the amount of liquid in the container. The electrodes 14 are electrically connected to an external driving and sensing circuit as described further below via, for example, a ribbon or flex circuit cable 18. As explained further below, an electrical circuit is connected to the electrodes of the array such that liquid level measurements can be made.

Figure 2A:
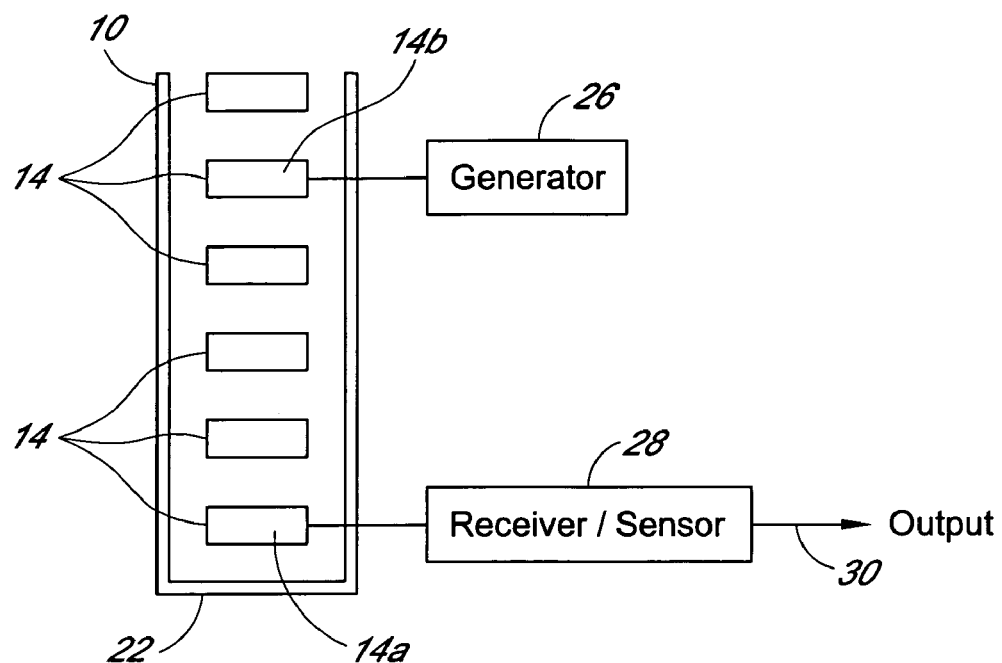
FIGS. 2A and 2B are block diagrams of electrode, receiver, generator, and sensor configurations.
Figure 2B:
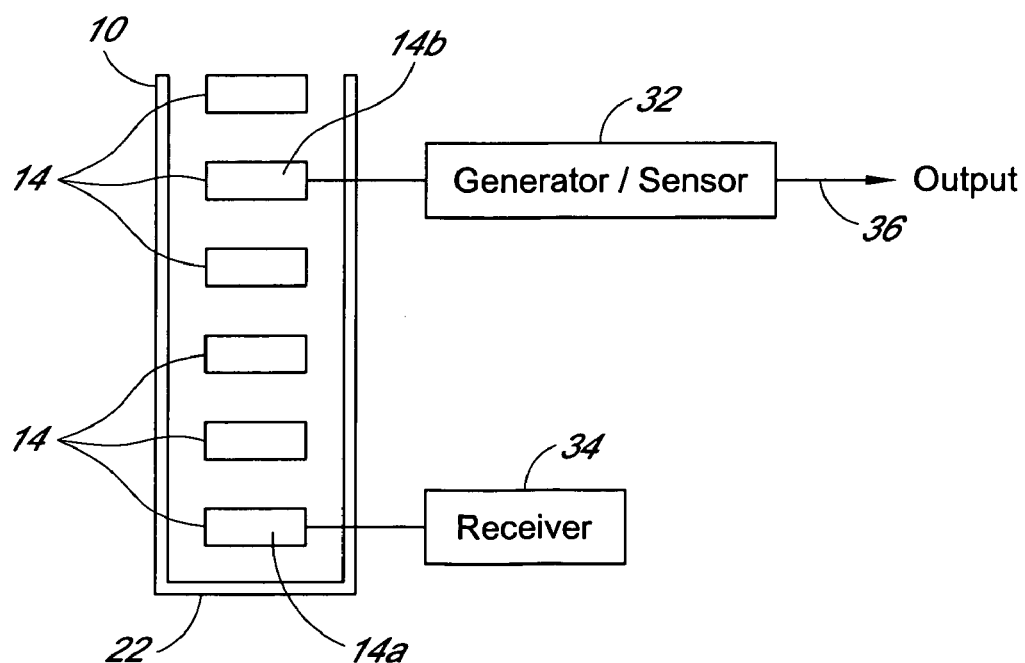

FIGS. 2A and 2B illustrate suitable signal generator and receiver configurations that have been found suitable for use with the electrode array of FIG. 1. To determine whether a resistive liquid electrical junction is created between a pair of electrodes 14, a signal generator, signal receiver, and a sensor are coupled to a pair of electrodes 14a, 14b. In the embodiment shown in FIG. 2A, a signal receiver/sensor 28 is coupled to one electrode 14a, and a signal generator 26 is coupled to a second electrode 14b. As shown in FIG. 2A, the electrode 14a with the signal receiver attached to it is the lowennost electrode positioned proximate to the bottom 22 of the container 10. In operation, a signal (such as a positive voltage) is applied to the electrode 14b by the generator 26. If an electrical connection exists between the electrode 14b and the other electrode 14a due to the presence of conductive liquid spanning these two electrodes, current will flow from electrode 14b to electrode 14a. This current is received and sensed by the receiver/sensor 28, producing an output signal 30. In most advantageous embodiments, the output 30 varies depending on the resistance between the two electrodes 14a and 14b. It can be appreciated that if the generator is applied sequentially to different electrodes 14 in the array, it can be determined which electrodes lie beneath the surface of the liquid, and which electrodes lie above the surface of the liquid.

In another embodiment illustrated in FIG. 2B, the sensor is combined with the generator as unit 32 producing an output 36, whereas the receiver 34 provides a source or sink for current but has no associated sensing circuitry. It will also be appreciated that the generator could be connected to the lower electrode 14a and the receiver could be connected to the upper electrode 14b.

Those of skill in the art will appreciate that the designations "generator" and "receiver" are somewhat arbitrary and do not imply that the current necessarily flows from the generator to the receiver, or that the potential on the receiver is constant. Any potential difference of any relative polarity, including bipolar signals, can be used.

Figure 3A:
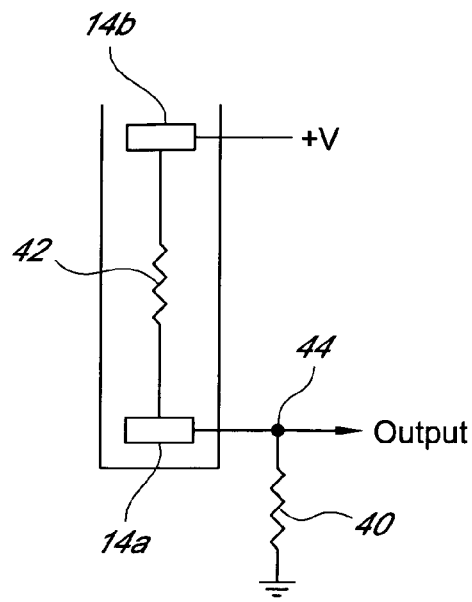
FIGS. 3A–3D are schematics of several exemplary receiver, generator, and sensor circuits.

FIGS. 3A–3D illustrate a few different embodiments of signal generators and signal receivers that can be used. One very simple arrangement is shown in FIG. 3A. In this Figure, the receiver/sensor is simply a resistor 40 connected between the lower electrode 14a and ground or circuit common. A voltage supply acts as a generator and applies a voltage (+V) to a selected upper electrode. The resistor 40 combined with the resistance of the liquid between the electrodes (designated 42) forms a voltage divider. Current flowing through the two resistors to ground will produce a voltage between +V and 0 at node 44. The voltage at node 44 is used as an output signal. If the circuit is open, the resistance 42 between the electrodes will be very high, and node 44 will be at ground potential. If a conductive liquid is present between the electrodes, the voltage will rise to +V times the resistance of resistor 40 divided by the sum of the resistances of both resistors 40 and 42. As will be explained further below, if the value of resistor 40 is chosen correctly, it is possible to detect not only whether upper electrode 14b is submerged and un-submerged, but also whether electrode 14b is partially submerged. This can further improve the sensitivity and accuracy of the device.

Figure 3C:
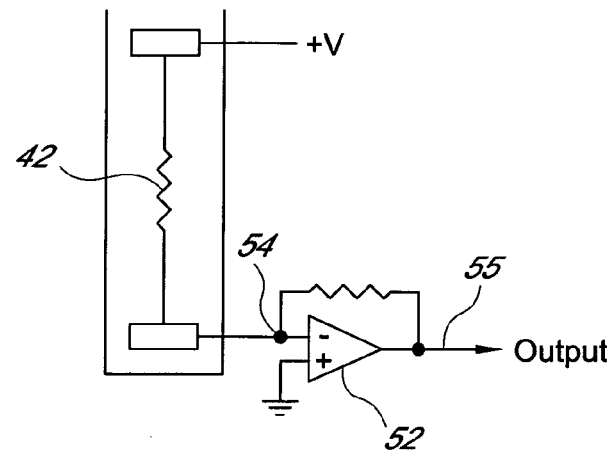
Figure 3B:
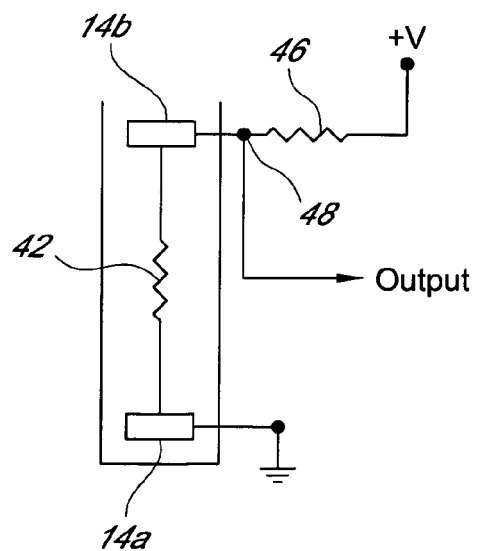

FIG. 3B illustrates a modification of the circuit of FIG. 3A that operates under the same basic principle. In this case, however, the generator/sensor is a resistor 46 coupled between the voltage supply and the upper electrode 14b. The receiver is simply a ground or circuit common connection coupled to lower electrode 14a. A voltage divider is again formed by resistors 42 and 46, and the voltage at node 48 is used as an output signal. This time, however, the voltage at node 48 is at +V when no electrical connection exists between the electrodes, and drops to between +V and 0 as the liquid spans the electrodes.

Figure 3D:
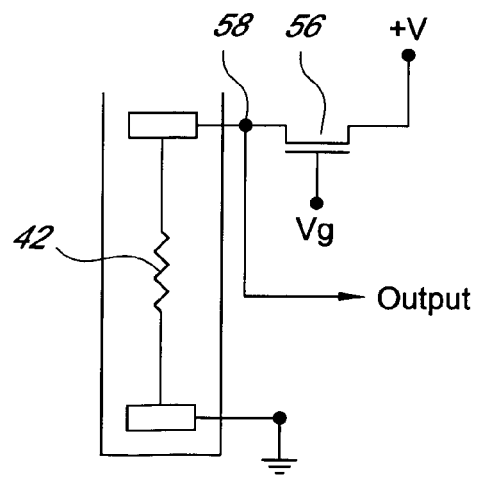

FIGS. 3C and 3D illustrate other possible generator, receiver sensor, configurations. FIG. 3C includes a receiver coupled to the lower electrode 14a which comprises a current to voltage converter 52. This device will hold the node 54 to near ground, and provide an inverted output at node 55 proportional to the current flow from the upper electrode 14b to the lower electrode 14a. This circuit reduces the impedance of the circuit by eliminating the extra resistance 40 and 46 of FIGS. 3A and 3B. FIG. 3D illustrates the use of a transistor as a generator/sensor circuit. If the transistor is operated in saturation, it can act as a constant current source with a current determined by the applied gate voltage. The voltage at node 58 can be used as an output signal, which will drop as the resistance 42 drops. This type of current source generator (rather than a voltage source generator) can help control and reduce the currents passed through the liquid during operation.

Figure 4B:
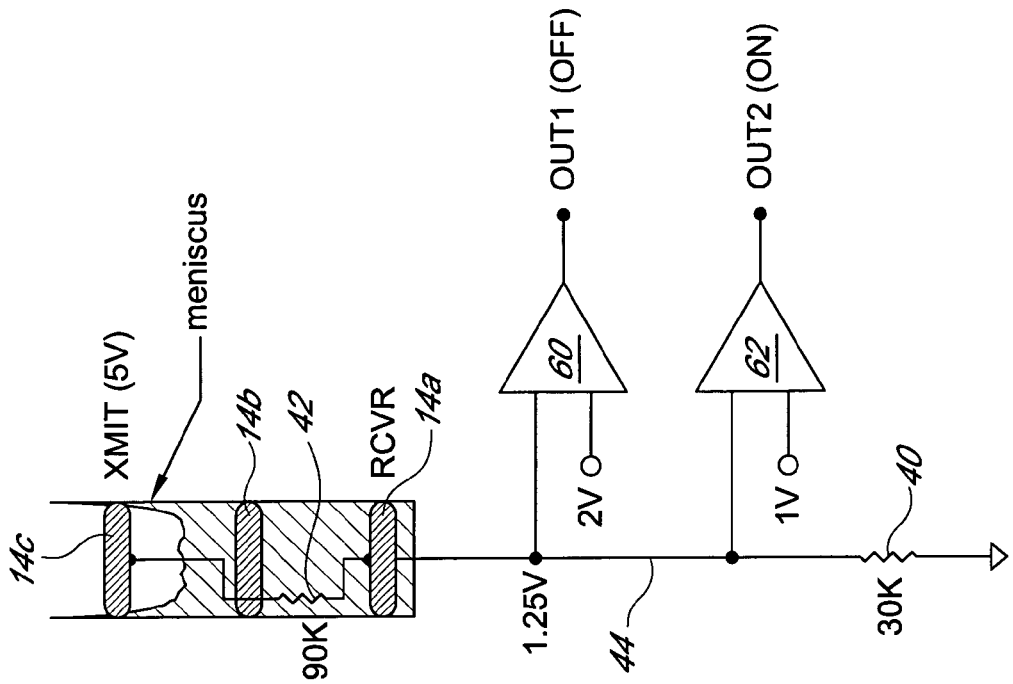
FIGS. 4A and 4B illustrates an output discriminator coupled to the output generation circuit of FIG. 3A.
Figure 4A:
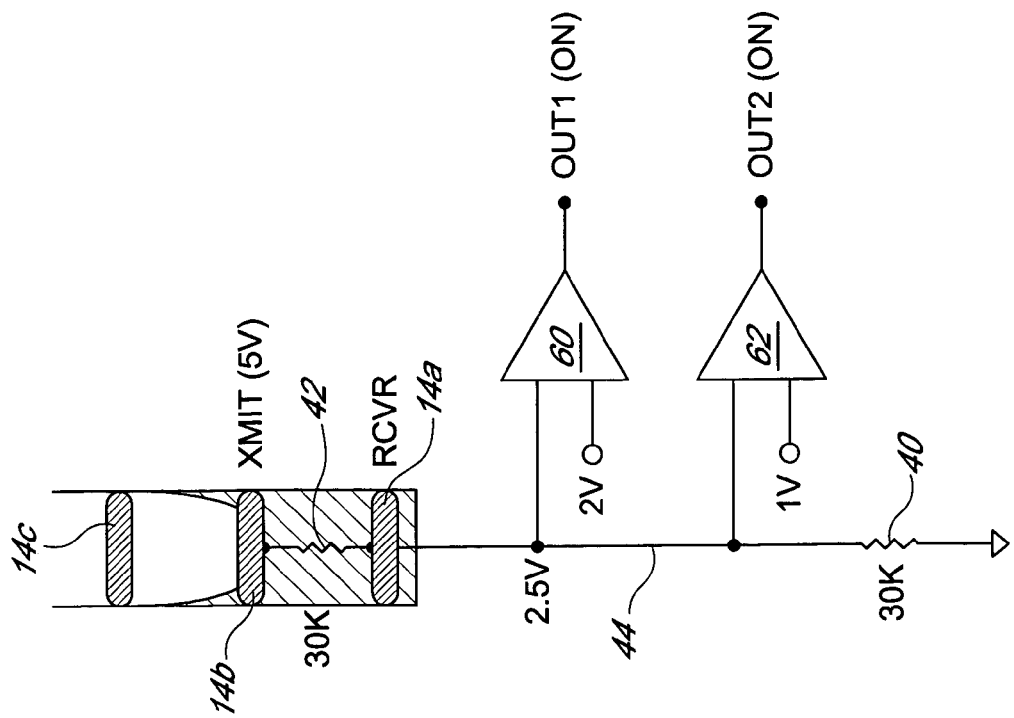

FIGS. 4A and 4B illustrate the generator and receiver configuration of FIG. 3A with the added feature of a discrimination circuit tied to node 44. The discrimination circuit comprises a first comparator 60 and a second comparator 62. As in FIG. 3A, the bottommost electrode is a receiver and the electrodes above it are selectively tied to a voltage source to act as transmitters. To detect the liquid level, a 5-volt potential is successively applied to the transmitters, starting with the topmost one. The voltage at node 44 is sensed with the comparator circuit.

As shown in FIG. 4A, applying 5 volts to the upper transmitter 14c results in no signal on the receiver because no liquid is in contact with the upper electrode 14c. In this case, both outputs of the comparators are off as node 44 will be tied to ground through resistor 40. But as the same 5 volts are next applied to the lower transmitter, 2.5 volts will appear at the inputs of both comparators if the resistance of resistor 40 is selected to be approximately equal to the resistance between electrodes when spanned by the liquid being measured. With the two set points as shown in FIG. 4A, both comparator outputs will be on. We can thus distinguish between the two transmitters and from this information determine that the liquid is at the level of the lower transmitter.

With the two comparators programmed as shown in FIGS. 4A and 4B, it is also possible to detect the liquid level when it is midway between two transmitters. At this position, a thin film of liquid establishes partial electrical conduction between the bulk liquid and the upper transmitter. Thus, as shown in FIG. 4B, even though the meniscus is only midway between the lower and upper transmitter, there is already a conduction path between the upper electrode 14c and the bottom electrode 14a. More importantly, this conduction path has a higher resistance than the resistance between electrodes 14a and 14b shown in FIG. 4A where the base of the meniscus actually touches the lower transmitter electrode 14b. Consequently, a smaller voltage appears at the inputs of the comparators when 5 volts are applied to the upper transmitter and only comparator 62 is triggered. Therefore, when comparator 60 and 62 are off and on, respectively, it can be determined that the meniscus is midway in between two transmitter electrodes 14b and 14c. In effect, by using two comparators programmed at two different set points, the spatial resolution of the sensor is doubled.

It may be noted that the liquid resistance between two electrodes depends on the conductivity of the liquid, the material of the electrodes, and the total surface area of electrode/liquid contact, but is not strongly dependent on the distance between the electrodes being used as transmitter and receiver. This allows a single resistance value to be used for resistor 40 regardless of whether the electrode being used as the transmitter is at the top or bottom of the container.

Figure 5:
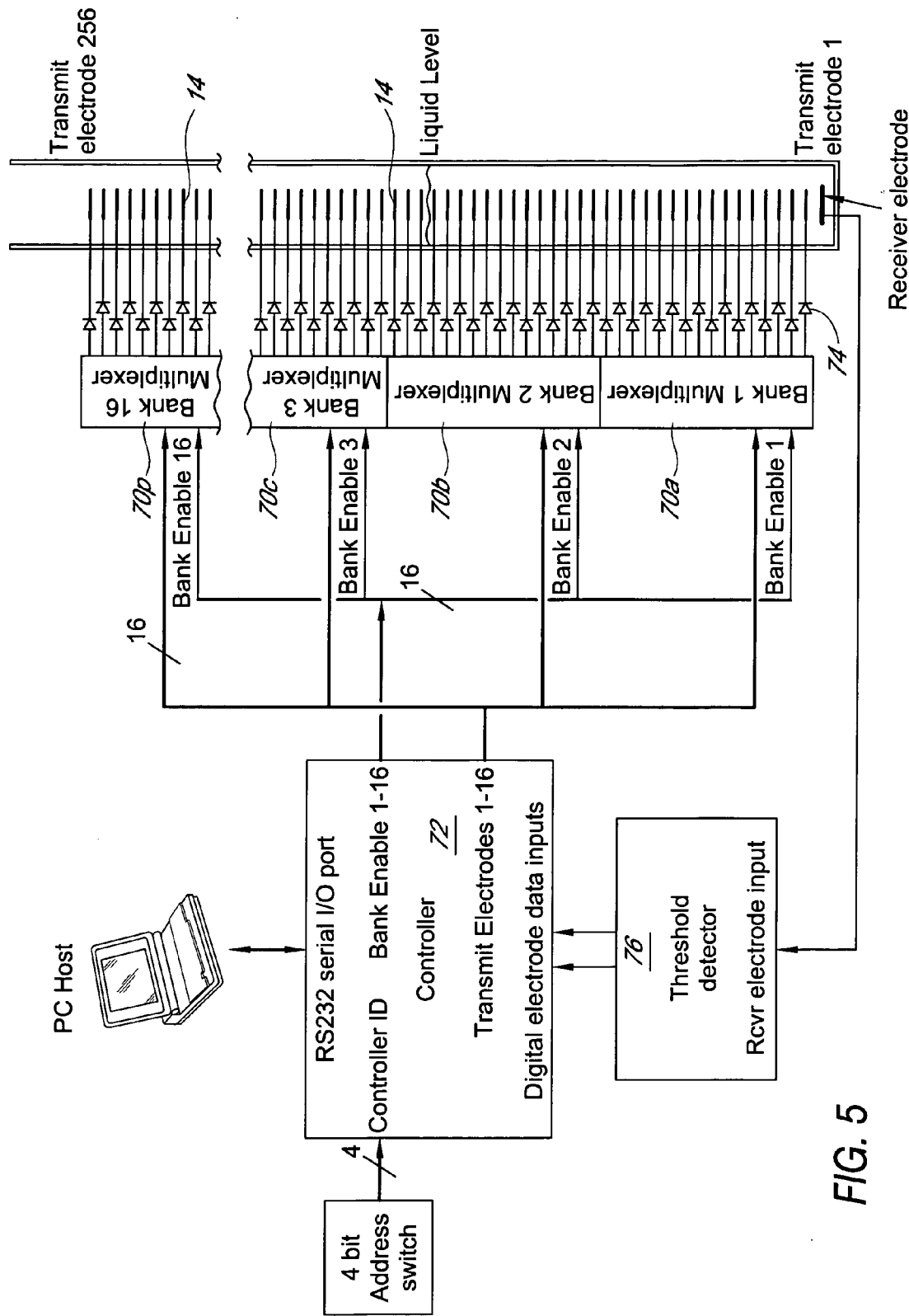
FIG. 5 illustrates an exemplary system for liquid level monitoring.

A liquid level sensing system incorporating the circuit of FIGS. 4A and 4B is illustrated in FIG. 5. In this embodiment, there are 256 transmitter electrodes 14 laid out vertically at a pitch of 0.050 inch. These electrodes are addressed by 16 multiplexers 70a–70p, which help to reduce the 256 electrical connections from the electrode array to the controller 72 to thirty-two; the controller only enables one of the 16 multiplexers at any time. It would also be possible to use an 8 bit input decoder. The isolation diodes 74 prevent the current injected into the energized transmitter from flowing into the non-energized ones. A receiver electrode is located at the bottom of this array of transmitter electrodes. All electrodes are heavily gold plated to prevent corrosion by conductive liquids that usually contain electrolytes. The controller sequentially energizes these transmitters starting from the top and concomitantly checks the receiver using the Threshold Detector 76 which comprises the pair of comparators 60, 62 of FIGS. 4A and 4B.

To avoid polarization of the electrodes, only short pulses on the order of microseconds are used to energize the transmitters. This operation stops as soon as a signal is detected from the receiver; the position of the transmitter at that moment is sent to the computer. From this information and the fact that the transmitters are separated by 0.050 inch, the computer can compute the height of the liquid. If the cross section of the tube is known, the total volume can also be obtained.

Liquids do not have to be strongly conductive to be sensed by this device. In one embodiment, solutions with 5 mM NaCl can be detected. The load resistor on the receiver electrode and the set points for the two comparators can be changed to detect less conductive liquids. The load resistor can be increased to 300K allowing 500 µM of NaCl to be detected.

It will be appreciated that such a system has several advantageous features. There is no need to calibrate the sensor as the level of the liquid is inferred from the spacing of the transmitter electrodes and the position of the transmitter that first causes a signal to be detected at the receiver. The resolution of the sensor can be increased by using the interpolation method described above with reference to FIGS. 4A and 4B and/or by reducing the pitch of the transmitter array. This pitch can easily be reduced to 0.025 inch using standard printed circuit board technology. In addition, because the active part of the sensor is just a printed circuit board, it can be made very small. A detector on the order of 1 cm$^2$ is easily achievable. Furthermore, there are no moving parts, the device is entirely solid state.

What is claimed is:

1. A liquid level sensor comprising:
   a container;
   a plurality of electrodes within said container arranged in a defined relationship with respect to a container filling trajectory;
   a signal generator coupled to one or more of said plurality of electrodes;
   a signal receiver coupled to one or more of said plurality of electrodes, wherein one of said signal generator and said signal receiver is coupled to an electrode proximate to a bottom of said container; and
   a sensing circuit coupled to at least one of said signal generator and signal receiver, wherein said sensing circuit is configured to produce a series of outputs indicative of electrical resistance between selected series of pairs of said plurality of electrodes, and wherein said electrodes are spaced a distance which allows a meniscus between two sequential pairs of said electrodes to be measured.

2. The sensor of claim 1, wherein said generator comprises a voltage source.

3. A liquid level sensor comprising:
   a plurality of electrodes arranged in a defined relationship with respect to a container comprising a container filling trajectory such that as said container fills with liquid, said electrodes are sequentially submerged in said liquid, and wherein said electrodes are spaced a distance which allows a meniscus between two sequential pairs of said electrodes to be measured;
   a signal generator coupled to one or more of said plurality of electrodes;
   a signal receiver coupled to one or more of said plurality of electrodes; and
   a sensing circuit coupled to at least one of said signal generator and signal receiver, wherein said sensing circuit is configured to produce an output indicative of electrical resistance between at least one pair of said plurality of electrodes.

4. The sensor of claim 3, wherein said sensing circuit is associated with said signal receiver.

5. The sensor of claim 3, wherein said sensing circuit is associated with said signal generator.

6. The sensor of claim 3, wherein said signal receiver and said sensing circuit comprise a resistor coupled between one of said electrodes and a circuit common.

7. The sensor of claim 6, wherein said resistor forms a voltage divider with an electrical resistance of said liquid.

8. The sensor of claim 6, wherein said resistor is coupled to an electrode proximate to a bottom of said container.

9. The sensor of claim 8, wherein said generator comprises a voltage source.

* * * * *